(12) United States Patent
Garnett

(10) Patent No.: US 7,410,437 B2
(45) Date of Patent: Aug. 12, 2008

(54) PLANETARY DRIVE ARRANGEMENT

(75) Inventor: Stephen C. Garnett, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 231 days.

(21) Appl. No.: 11/214,928

(22) Filed: Aug. 31, 2005

(65) Prior Publication Data
US 2007/0049439 A1 Mar. 1, 2007

(51) Int. Cl.
*F16H 3/72* (2006.01)
(52) U.S. Cl. .......................................... 475/5; 180/6.28
(58) Field of Classification Search ...................... 475/3, 475/5; 180/6.28
See application file for complete search history.

(56) References Cited

U.S. PATENT DOCUMENTS

| | | | |
|---|---|---|---|
| 4,434,680 A | 3/1984 | Riediger et al. | |
| 4,700,794 A * | 10/1987 | Bernhagen et al. | ......... 180/6.44 |
| 4,803,897 A | 2/1989 | Reed | |
| 4,848,186 A | 7/1989 | Dorgan et al. | |
| 5,067,932 A | 11/1991 | Edwards | |
| 5,139,465 A | 8/1992 | Sato | |
| 5,168,946 A | 12/1992 | Dorgan | |
| 5,195,600 A | 3/1993 | Dorgan | |
| 5,445,234 A | 8/1995 | Hall, III | |
| 5,509,491 A | 4/1996 | Hall, III | |
| 5,575,730 A | 11/1996 | Edwards et al. | |
| 5,669,842 A | 9/1997 | Schmidt | |
| 5,851,162 A | 12/1998 | Tether | |
| 5,890,981 A | 4/1999 | Coutant et al. | |
| 5,916,050 A | 6/1999 | Coutant et al. | |
| 5,935,035 A | 8/1999 | Schmidt | |
| 5,947,855 A | 9/1999 | Weiss | |
| 5,980,410 A | 11/1999 | Stemler et al. | |
| 6,090,005 A | 7/2000 | Schmidt et al. | |
| 6,203,463 B1 | 3/2001 | Casey et al. | |
| 6,371,882 B1 | 4/2002 | Casey et al. | |
| 6,491,599 B1 | 12/2002 | Schmidt | |
| 6,656,074 B2 | 12/2003 | Andriani | |
| 6,892,837 B2 | 5/2005 | Simmons et al. | |
| 7,053,566 B2 * | 5/2006 | Aizawa et al. | ................. 318/34 |
| 7,128,676 B2 * | 10/2006 | Kinugasa et al. | ............... 475/5 |
| 2003/0119620 A1 | 6/2003 | Zwilling et al. | |
| 2004/0069542 A1 | 4/2004 | Simmons et al. | |
| 2004/0116228 A1 | 6/2004 | Thompson | |

* cited by examiner

*Primary Examiner*—Ha D. Ho
(74) *Attorney, Agent, or Firm*—Finnegan, Henderson, Farabow, Garrett & Dunner

(57) ABSTRACT

A drive arrangement for a machine includes a first planetary gear set, a second planetary gear set, a third planetary gear set, a first motor, a second motor, and a third motor. The first, second, and third motors are drivingly connected to the first, second, and third planetary gear sets to simultaneously generate fewer than three separate output rotations.

29 Claims, 4 Drawing Sheets

| Embodiment | Member No. | Planetary Element Connections | | | | | | | | | Motor Input | | | Track Output | |
|---|---|---|---|---|---|---|---|---|---|---|---|---|---|---|---|
| | | 52s | 52p | 52r | 54s | 54p | 54r | 56s | 56p | 56r | 24 | 26 | 28 | 20L | 20R |
| 1 | 1 | | C | | | C | | | | C | | | | C | |
| | 2 | | | | | | | C | | | | | C | | |
| | 3 | | | C | | | C | | | | | C | | | |
| | 4 | | C | | | C | | | | | C | | | | |
| | 5 | C | | | | | | | | | | | | | C |
| 2 | 1 | C | | | C | | | | | C | | | C | | |
| | 2 | | | | | | | C | | | | | | C | |
| | 3 | | C | | | | C | C | | | | | | | C |
| | 4 | | | | C | | | | | | | C | | | |
| | 5 | | C | | | | | | | | C | | | | |
| 3 | 1 | | | | | | | C | | | | | C | | |
| | 2 | | | | | C | C | | | | | | | C | |
| | 3 | | C | | C | | C | | | | C | | | | |
| | 4 | C | | | C | | | | | | | | C | | |
| | 5 | | C | | | | | | | | | | | | C |
| 4 | 1 | | | | C | | | | C | | | C | | C | |
| | 2 | | C | | | | | C | | C | | | | | |
| | 3 | C | | | C | | C | | | | | C | | | |
| | 4 | | | | | C | | | | | | | C | | |
| | 5 | | C | | | | | | | | | | | | C |
| 5 | 1 | | | | | | | C | | | | | C | | |
| | 2 | C | | | | C | C | | | | | | | C | |
| | 3 | | C | | | | C | | | | | | | | C |
| | 4 | | | | C | | | | | | | C | | | |
| | 5 | | C | C | | | | | | | C | | | | |
| 6 | 1 | | | | | | | C | | | | | C | | |
| | 2 | | C | | | | C | | | | | | | C | |
| | 3 | C | | | C | | C | | | | | C | | | |
| | 4 | | | | C | | | | | | | | | | C |
| | 5 | | C | | C | | | | | | C | | | | |
| 7 | 1 | | | | | | | C | | | | | C | | |
| | 2 | C | | | C | | | C | | | | | | C | |
| | 3 | | C | | C | | C | | | | | | | | C |
| | 4 | | | | C | | | | | | | C | | | |
| | 5 | | C | | | | | | | | C | | | | |
| 8 | 1 | | | | | | | C | | | | | C | | |
| | 2 | | C | | | | C | | | | | | C | | |
| | 3 | | | | C | C | | | | | | C | | | C |
| | 4 | | C | | C | | | | | | | C | | | |
| | 5 | C | | C | | | | | | | C | | | | |
| 9 | 1 | C | | | | | C | | | | | C | | | |
| | 2 | | | | | | C | | | | | | | C | |
| | 3 | | C | | C | C | | | | | | | | | C |
| | 4 | | | C | | | | | | C | | | | | |
| | 5 | | C | C | | | | | | | C | | | | |
| 10 | 1 | | | | | | | C | | | | | C | | |
| | 2 | | | | C | C | | | | | | C | | | |
| | 3 | | C | | | C | | | | | | | | | C |
| | 4 | C | | | C | | | | | | | C | | | |
| | 5 | | C | C | | | | | | | C | | | | |

C = CONNECTED

FIG. 3A

| Embodiment | Member No. | Planetary Element Connections | | | | | | | | | Motor Input | | | Track Output | |
|---|---|---|---|---|---|---|---|---|---|---|---|---|---|---|---|
| | | 52s | 52p | 52r | 54s | 54p | 54r | 56s | 56p | 56r | 24 | 26 | 28 | 20L | 20R |
| 11 | 1 | | | | | | | | | C | | | C | | |
| | 2 | | | | | C | | | C | | | | | C | |
| | 3 | | C | | C | | C | | | | | | | | C |
| | 4 | C | | | | | | | | | | | | | |
| | 5 | | C | | | | | | | | C | | | | |
| 12 | 1 | C | | | | | | | | C | | | C | | |
| | 2 | | | | | | | | C | | | | | C | |
| | 3 | | | C | | | C | C | | | | | | | C |
| | 4 | | C | | | C | | | | | C | | | | |
| | 5 | | | | C | | | | | | | C | | | |
| 13 | 1 | | | | C | | | | | C | | | C | | |
| | 2 | C | | | | | | | C | | | | | C | |
| | 3 | | C | | | C | C | | | | | | | | C |
| | 4 | | | | | C | | | | | | C | | | |
| | 5 | | C | | | | | | | | C | | | | |
| 14 | 1 | C | | | C | | | | | C | | | C | | |
| | 2 | | | | | | | | C | | | | | C | |
| | 3 | | C | | | | C | | | | | | | | C |
| | 4 | | | | | C | | | | | | C | | | |
| | 5 | | C | | C | | | | | | C | | | | |
| 15 | 1 | | | | | | | | | C | | | C | | |
| | 2 | C | | | | C | | C | | | | | | C | |
| | 3 | | C | | | | C | | | | | | | | C |
| | 4 | | | | | C | | | | | | C | | | |
| | 5 | | C | | C | | | | | | C | | | | |
| 16 | 1 | | | | | | | | | C | | | C | | |
| | 2 | C | | | | C | | C | | | | | | C | |
| | 3 | | C | | C | | C | | | | C | | | | |
| | 4 | | | | | C | | | | | | C | | | |
| | 5 | | C | | | | | | | | | | | | C |
| 17 | 1 | C | | | C | | | | | C | | | C | | |
| | 2 | | | | | | | | C | | | | | C | |
| | 3 | | C | | | | C | | | | | | | | C |
| | 4 | | | | | C | | | | | | C | | | |
| | 5 | | | | C | C | | | | | C | | | | |
| 18 | 1 | | | | | | | | | C | | | C | | |
| | 2 | C | | | C | | | | C | | | | | C | |
| | 3 | | C | | | | C | | | | | | | | C |
| | 4 | | | | | C | | | | | | C | | | |
| | 5 | | | C | C | | | | | | C | | | | |
| 19 | 1 | C | | | C | | | | | C | | | C | | |
| | 2 | | | | | | | | C | | | | | C | |
| | 3 | | C | | | | C | | | | | | | | C |
| | 4 | | | | | C | | | | | C | | | | |
| | 5 | | | C | C | | | | | | | C | | | |

C = CONNECTED

FIG. 3B

PLANETARY DRIVE ARRANGEMENT

TECHNICAL FIELD

The present application is directed to a drive arrangement and, more particularly, to a planetary-type drive arrangement.

BACKGROUND

Work machines such as, for example, track-type tractors and other heavy construction, agriculture, and mining machines, are used to perform many tasks. To effectively perform these tasks, the work machines require a power source that provides significant power to a drive arrangement. The power source may be an engine such as, for example, a turbine engine, diesel engine, gasoline engine, or natural gas engine operated to generate a torque output at a range of speeds. The drive arrangement may include individual motors driven by the power source and associated with individual traction devices of the work machine. These individual motors must be sized to transmit the entire torque output of the power source to the associated traction device, for if one traction device slips due to unfavorable traction conditions, the entire torque output of the engine will be absorbed by the non-slipping traction device. In addition, due to regenerative forces, it may be possible to load a single motor and associated traction device with the entire torque output of the power source and an additional amount of torque that is being regenerated from a traction device located on an opposite side of the work machine. As a result of these occasional high-torque and/or high power loading situations, these motors are typically oversized for a majority of the work machine operation. In addition to the high component cost of the oversized motors and related packaging issues, operation of these oversized motors during low-torque loading conditions is inefficient.

One attempt to reduce the cost and inefficiencies associated with oversized drive arrangements is described in U.S. Pat. No. 5,168,946 (the '946 patent) issued to Dorgan on Dec. 8, 1992. The '946 patent describes an electric drive system having first, second, and third electric motors connected via left and right combining gear sets to respective left and right vehicle tracks. To propel the vehicle in low range operations (e.g., low speed, high torque), the first and second motors are energized, while the a brake is applied to the third motor. To propel the vehicle in high range operations (e.g., high speed, low torque), all three motors are energized. Regeneration of power may be available during high range operations. The use of three motors, rather than two, in high range operations results in a reduction of motor sizes.

Although the electric drive system of the '946 patent may reduce some of the cost and inefficiency associated with oversized motors, it may be operationally limited and inefficient. In particular, the third motor may only be used during high range operations. The largest amounts of torque are generated during low range operations that involve steering or traction loss. Because only two motors of the '946 patent propel the vehicle during low range operations, the two operational motors must still be oversized to accommodate the associated high torque loads. In addition, regeneration is most effective during steering operations of the vehicle, which most often occur during low range operation. Because regeneration is only available during high range operations of the vehicle described in the '946 patent, the electric drive system may lack efficiency.

The planetary drive arrangement of the present disclosure solves one or more of the problems set forth above.

SUMMARY OF THE INVENTION

One aspect of the present disclosure is directed to a drive arrangement. The drive arrangement includes a first planetary gear set, a second planetary gear set, a third planetary gear set, a first motor, a second motor, and a third motor. The first, second, and third motors are drivingly connected to the first, second, and third planetary gear sets to simultaneously generate fewer than three separate output rotations.

Another aspect of the present disclosure is directed to a method of driving a first and a second traction device. The method includes operating first, second, and third motors to generate fewer than three separate output rotations. The first, second, and third motors are connected to first, second, and third planetary gear sets.

BRIEF DESCRIPTION OF THE DRAWINGS

FIGS. 3A and 3B include a table relating gear connections of additional exemplary disclosed drive arrangements for the drive system of FIG. 2.

DETAILED DESCRIPTION

Figure 1:
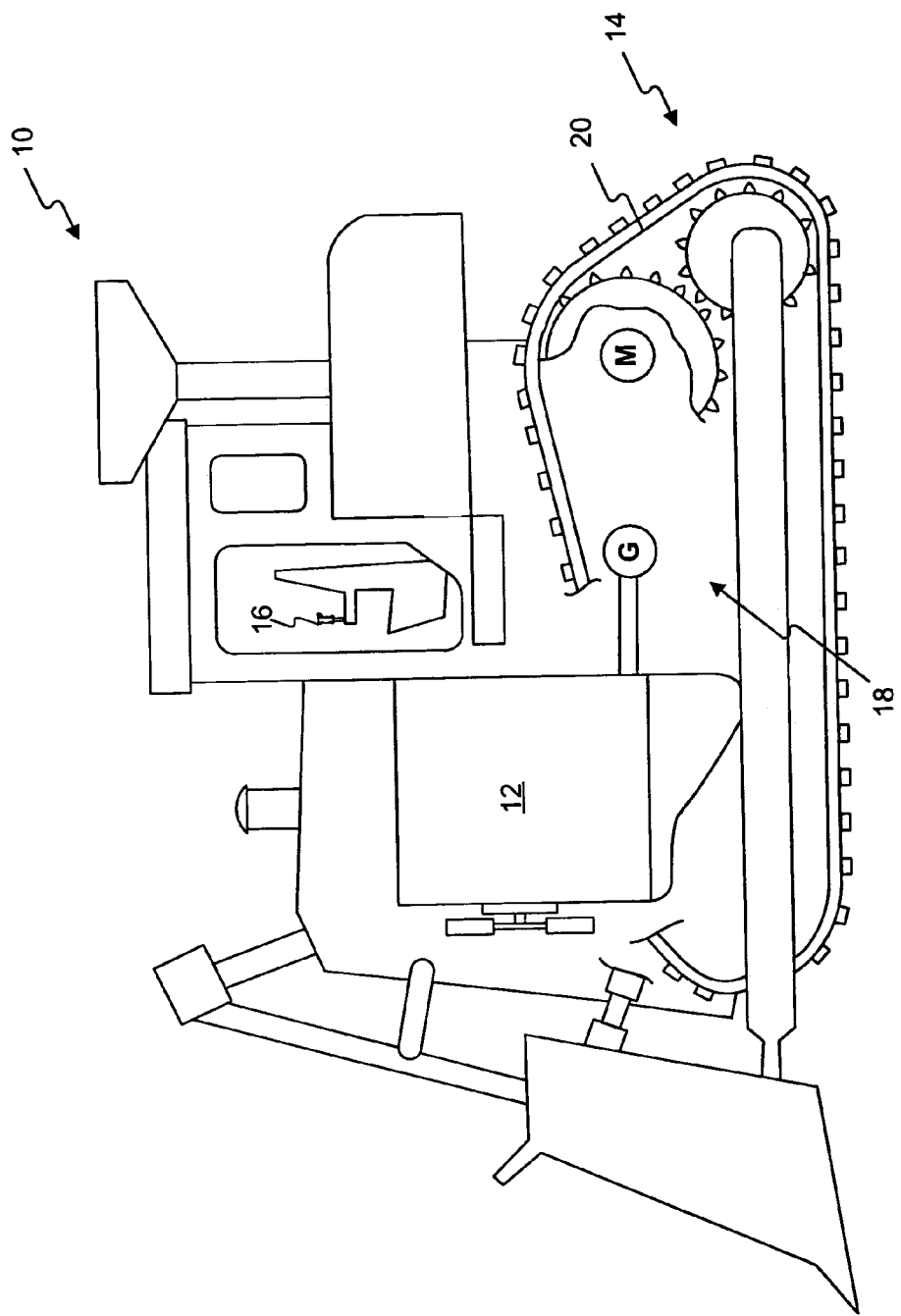
FIG. 1 is a diagrammatic illustration of an exemplary disclosed work machine.

FIG. 1 illustrates an exemplary work machine 10. Work machine 10 may be a mobile machine that performs some type of operation associated with an industry such as mining, construction, farming, transportation, or any other industry known in the art. For example, work machine 10 may be an earth moving machine such as a track-type tractor. Work machine 10 may alternatively embody an on-highway truck, a passenger vehicle, or any other suitable operation-performing work machine. Work machine 10 may include a power source 12, a traction device 14, an operator interface device 16, and a drive system 18 configured to transmit a power output of power source 12 to traction device 14 in response to an input received via operator interface device 16.

Power source 12 may be configured to produce a power output and may include an internal combustion engine. For example, power source 12 may include a diesel engine, a gasoline engine, a gaseous fuel-powered engine, a turbine engine, or any other type of engine apparent to one skilled in the art. It is also contemplated that power source 12 may embody another source of power such as a fuel cell, a battery, or any other source of power known in the art.

Traction device 14 may include tracks 20L and 20R located on each side of work machine 10 (only 20L shown in FIG. 1). Alternatively, traction device 14 may include wheels, belts, or other driven traction devices. Traction device 14 may be driven by drive system 18 to rotate in accordance with output rotations of drive system 18.

Operator interface device 16 may be located within an operator cabin of work machine 10, in close proximity to a seat and may embody any one of numerous devices to control functions of work machine 10. In one example, operator interface device 16 may embody a joystick controller. It is contemplated that operator interface device 16 may embody additional or different control devices such as, for example, pedals, levers, switches, buttons, wheels, and other control devices known in the art.

Operator interface device 16 may be configured to regulate a travel speed, rimpull torque, and/or travel direction of work machine 10. In particular, a travel speed and/or rimpull torque of tracks 20L, R may be proportional to an actuation position of operator interface device 16. For example, operator interface device 16 may be tiltable about a first pivot axis in a first direction to indicate a desired increase in travel speed and/or rimpull torque of work machine 10. Similarly, operator interface device 16 may be tiltable about the first pivot axis in a second direction opposite the first direction to indicated a desired decrease in the travel speed and/or rimpull torque of work machine 10. The travel direction may be controlled by tilting operator interface device 16 about a second pivot axis substantially perpendicular to the first pivot axis causing one of tracks 20L, R to move at a faster or slower speed, or in an opposite direction from the other one of tracks 20L, R that is located on the opposite side of work machine 10.

Figure 2:
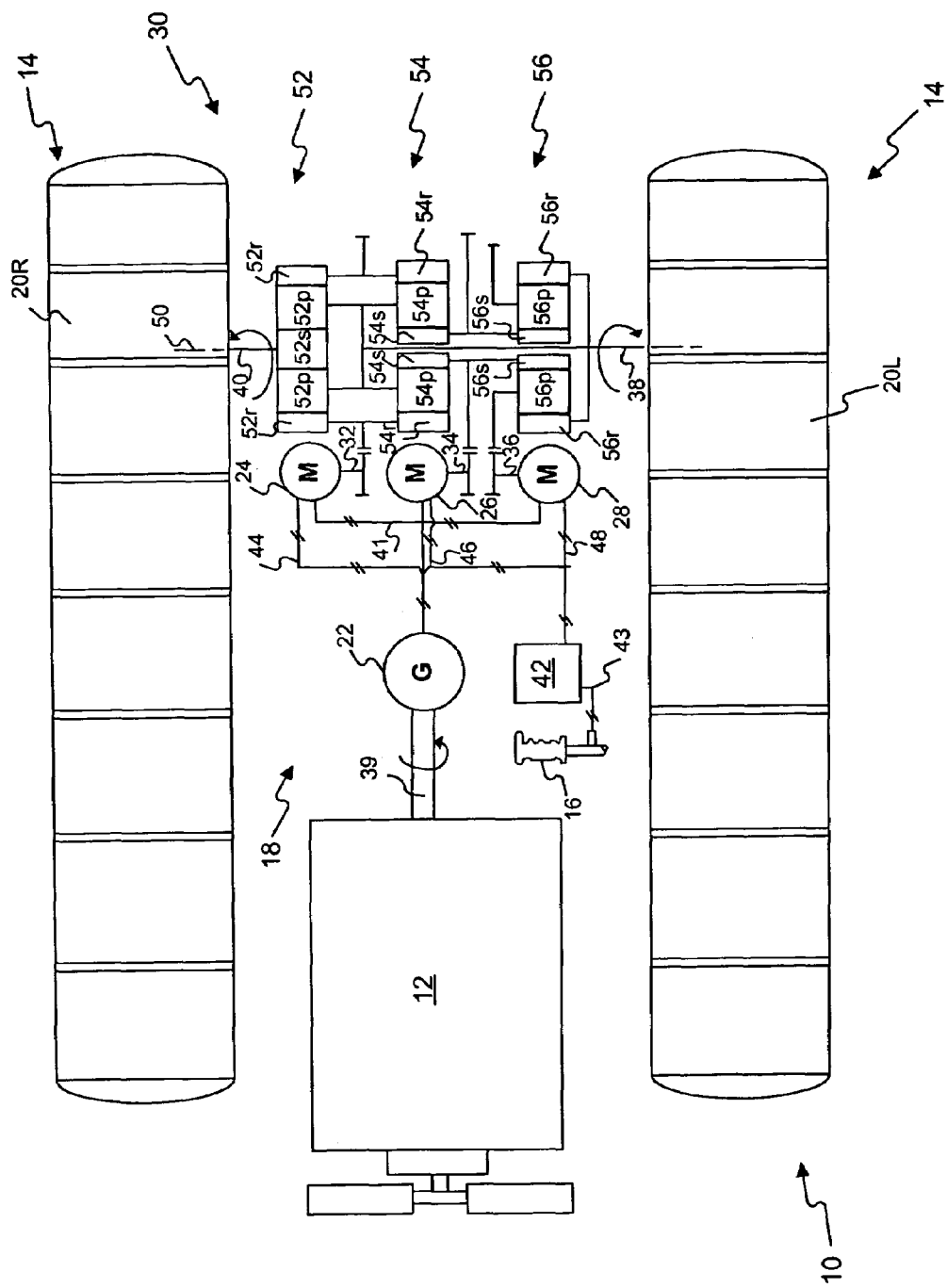
FIG. 2 is a schematic illustration of an exemplary disclosed drive system for the work machine of FIG. 1.

As illustrated in FIG. 2, drive system 18 may include numerous components that interact to transmit power from power source 12 to tracks 20L, R. In particular, drive system 18 may embody an electric transmission having a generator 22, a first motor 24, a second motor 26, a third motor 28, and a planetary gear arrangement 30. First, second, and third motors 24-28 may be selectively operated to propel work machine 10 in a straight forward or reverse direction and to turn or pivot work machine 10. It is contemplated that drive system 18 may alternatively embody a hydraulic transmission having a hydraulic pump fluidly connected to drive three hydraulic motors. The output of first, second, and third motors 24-28 may provide input power to planetary gear arrangement 30 via input shafts 32, 34, and 36, respectively. Planetary gear arrangement 30 may be connected to and configured to rotatably drive track 20L via a first output shaft 38, and track 20R via a second output shaft 40, thereby propelling work machine 10.

Generator 22 may be a three-phase permanent magnet alternating field-type generator configured to produce a power output in response to a rotational input from power source 12. It is also contemplated that generator 22 may be a switched reluctance generator, a direct phase generator, or any other appropriate type of generator known in the art. Generator 22 may include a rotor (not shown) rotatably connected to power source 12 by any means known in the art such as, for example, by a direct crankshaft connection 39, via a gear train, through a hydraulic circuit, or in any other appropriate manner. Generator 22 may be configured to produce electrical power output as the rotor is rotated within a stator (not shown) by power source 12. Generator 22 may be electrically connected to a common bus 41 via a generator inverter (not shown), which may be configured to invert the three-phase alternating power to direct phase power.

Common bus 41 may include positive and negative power lines (not shown) that electrically connect the generator inverter to motors 24-28 by way of one or more motor inverters (not shown). Common bus 41 may also be electrically connected to power storage devices such as batteries (not shown), capacitors (not shown), and other power storage devices known in the art, and to accessory power loads to provide power to and/or to remove power from common bus 41.

Each of motors 24-28 may be permanent magnet alternating field-type motors configured to receive power from common bus 41 and to input power to planetary gear arrangement 30. It is contemplated that motors 24-28 may be switched electric motors, direct phase motors, or any other appropriate type of motors known in the art. It is also contemplated that motors 24-28 may supply power to common bus 41 during a power regeneration event (e.g., when tracks 20L or 20R drive motors 24-28).

A controller 42 may be communicatively connected to operator interface device 16 and motors 24-28. In particular, controller 42 may be in communication with operator interface device 16 by way of a communication line 43. Controller 42 may be in communication with motors 24-28 by way of communication lines 44, 46, and 48, respectively. It is contemplated that controller 42 may also be in communication with power source 12, generator 22, common bus 41, and/or one or more sensors (not shown) associated with tracks 20L, R, if desired.

Controller 42 may embody a single microprocessor or multiple microprocessors that include a means for controlling an operation of drive system 18. Numerous commercially available microprocessors can be configured to perform the functions of controller 42. It should be appreciated that controller 42 could readily embody a general work machine or power source microprocessor capable of controlling numerous work machine or power source functions. Controller 42 may include all the components necessary to perform the required system control such as, for example, a memory, a secondary storage device, and a processor, such as a central processing unit. One skilled in the art will appreciate that controller 42 can contain additional or different components. Associated with controller 42 may be various other known circuits such as, for example, power supply circuitry, signal conditioning circuitry, and solenoid driver circuitry, among others.

Controller 42 may be configured to control a power output of motors 24-28 in response to one or more input. In particular, controller 42 may receive an input via operator interface device 16 indicative of a desired travel speed, rimpull torque, and/or change in travel direction. Controller 42 may be configured to determine a required power output from planetary gear arrangement 30 and an associated power input from motors 24-28 that results in the desired travel speed, rimpull torque, and/or change in travel direction. Controller 42 may then command motors 24-28 to input the determined power to planetary gear arrangement 30.

Planetary gear arrangement 30 may include three planetary gear assemblies rotatably supported and aligned along a rotational axis 50 and disposed within a stationary housing (not shown). The structure of the gears, input members, output members, coupling members, and the connections therebetween can be achieved using components known in the art.

As will be explained in more detail in connection with the embodiments of this disclosure, a planetary gear set may have at least three elements, including a sun gear, a planet carrier having at least one set of planet gears, and a ring gear. The planet gears of the planet carrier may mesh with the sun gear and the ring gear, and with intermediate planet gears of the same planet carrier if intermediate planet gears are included in the planetary gear set. The sun gear, planet carrier, planet gears, and ring gear may all rotate together simultaneously. Alternatively, each of the sun gear, planet carrier, and ring gear may be held stationary. Each planetary gear set may receive one or more input rotations and generate one or more corresponding output rotations. The change in rotational speed between the inputs and the outputs may depend upon the number of teeth in the sun gear and the ring gear. The change in rotational speed may also depend upon the gear(s) that is used to receive the input rotation, the gear(s) that is selected to provide the output rotation, and which gear, if any, is held stationary.

Planetary gear arrangement 30 may include a first planetary gear set 52, a second planetary gear set 54, and a third planetary gear set 56. First planetary gear set 52 may include a sun gear 52$s$, a planet carrier 52$p$, and a ring gear 52$r$.

Second planetary gear set 54 may include a sun gear 54s, a planet carrier 54p, and a ring gear 54r. Third planetary gear set 56 may include a sun gear 56s, a planet carrier 56p, and a ring gear 58r.

The elements of the planetary gear arrangement 30 may be interconnected to form five rotating members. In particular, as illustrated in the embodiment of FIG. 2 ring gear 56r may be connected to planet carrier 54p and to planet carrier 52- to form the first rotating member. Planet carrier 56p may form the second rotating member. Sun gear 56s and sun gear 54s may be connected to form the third rotating member. Ring gear 52r may be connected to ring gear 54r to form the fourth rotating member. Sun gear 52s may form the fifth rotating member.

Planetary gear arrangement 30 may receive a power input from each of motors 24-28. In particular, in the embodiment of FIG. 2, motor 24 may be connected to the forth rotating member. Motor 26 may be connected to the third rotating member. Motor 28 may be connected to the second rotating member.

Planetary gear arrangement 30 may output power to each of tracks 20L and 20R. Specifically, track 20L may be connected to the first rotating member via output shaft 38. Track 20R may be connected to the fifth rotating member via output shaft 40.

FIGS. 3A and 3B include tables illustrating the interconnections described above with respect to the drive arrangement embodiment of FIG. 2, and the interconnections of alternative drive arrangement embodiments. For example, the second embodiment listed in the table of FIG. 3A includes ring gear 56r connected to sun gear 54s and sun gear 52s to form the first rotating member driven by motor 28. In this same embodiment, planet carrier 56p may form the second rotating member that drives track 20L. Sun gear 56s may be connected to ring gear 54r and to planet carrier 52p to form the third rotating member that drives track 20R. Planet carrier 54p may form the fourth rotating member driven by motor 26. Ring gear 52r may form the fifth rotating member driven by motor 24.

In the third embodiment listed in the table of FIG. 3A, ring gear 56r may form the first rotating member driven by motor 28. Planet carrier 56p may be connected to ring gear 54r to form the second rotating member that drives track 20L. Sun gear 56s may be connected to sun gear 54s and to planet carrier 52p to form the third rotating member driven by motor 24. Planet carrier 54p may be connected to sun gear 52s to form the fourth rotating member driven by motor 26. Ring gear 52r may form the fifth rotating member that drives track 20R.

In the fourth embodiment listed in the table of FIG. 3A, ring gear 56r may be connected to planet carrier 54p to form the first rotating member that drives track 20L. Planet carrier 56p may be connected to planet carrier 52p to form the second rotating member driven by motor 24. Sun gear 56s may be connected to sun gear 54s and to sun gear 52s to form the third rotating member driven by motor 26. Ring gear 54r may form the fourth rotating member driven by motor 28. Ring gear 52r may form the fifth rotating member that drives track 20R.

In the fifth embodiment listed in the table of FIG. 3A, ring gear 56r may form the first rotating member driven by motor 28. Planet carrier 56p may be connected to ring gear 54r and to sun gear 52s to form the second rotating member that drives track 20L. Sun gear 56s may be connected to planet carrier 52p to form the third rotating member that drives track 20R. Planet carrier 54p may form the fourth rotating member driven by motor 26. Sun gear 54s may be connected to ring gear 52r to form the fifth rotating member driven by motor 24.

In the sixth embodiment listed in the table of FIG. 3A, ring gear 56r may form the first rotating member driven by motor 28. Planet carrier 56p may be connected to ring gear 52r to form the second rotating member that drives track 20L. Sun gear 56s may be connected to sun gear 54s and to sun gear 52s to form the third rotating member driven by motor 26. Ring gear 54r may form the fourth rotating member that drives track 20R. Planet carrier 54p may be connected to planet carrier 52p to form the fifth rotating member driven by motor 24.

In the seventh embodiment listed in the table of FIG. 3A, ring gear 56r may form the first rotating member driven by motor 28. Planet carrier 56p may be connected to planet carrier 54p and sun gear 52s to form the second rotating member that drives track 20L. Sun gear 56s may be connected to sun gear 54s and to planet carrier 52p to form the third rotating member that drives track 20R. Ring gear 54r may form the fourth rotating member driven by motor 26. Ring gear 52r may form the fifth rotating member driven by motor 24.

In the eighth embodiment listed in the table of FIG. 3A, ring gear 56r may form the first rotating member driven by motor 28. Planet carrier 56p may be connected to ring gear 52r to form the second rotating member that drives track 20L. Sun gear 56s may be connected to ring gear 54r to form the third rotating member that drives track 20R. Planet carrier 54p may be connected to planet carrier 52p to form the fourth rotating member driven by motor 26. Sun gear 54s may be connected to sun gear 52s to form the fifth rotating member driven by motor 24.

In the ninth embodiment listed in the table of FIG. 3A, ring gear 56r may be connected to sun gear 52s to form the first rotating member driven by motor 28. Planet carrier 56p may form the second rotating member that drives track 20L. Sun gear 56s may be connected to ring gear 54r and to ring gear 52r to form the third rotating member that drives track 20R. Planet carrier 54p may form the fourth rotating member driven by motor 24. Sun gear 54s may be connected to planet carrier 52p to form the fifth rotating member driven by motor 26.

In the tenth embodiment listed in the table of FIG. 3A, ring gear 56r may form the first rotating member driven by motor 28. Planet carrier 56p may be connected to ring gear 54r to form the second rotating member that drives track 20L. Sun gear 56s may be connected to ring gear 52r to form the third rotating member that drives track 20R. Planet carrier 54p may be connected to sun gear 52s to form the fourth rotating member driven by motor 26. Sun gear 54s may be connected to planet carrier 52p to form the fifth rotating member driven by motor 24.

In the eleventh embodiment listed in the table of FIG. 3B, ring gear 56r may form the first rotating member driven by motor 28. Planet carrier 56p may be connected to planet carrier 54p to form the second rotating member that drives track 20L. Sun gear 56s may be connected to sun gear 54s and to planet carrier 52p to form the third rotating member that drives track 20R. Ring gear 54r may be connected to sun gear 52s to form the fourth rotating member driven by motor 26. Ring gear 52r may form the fifth rotating member driven by motor 24.

In the twelfth embodiment listed in the table of FIG. 3B, ring gear 56r may be connected to sun gear 52s to form the first rotating member driven by motor 28. Planet carrier 56p may form the second rotating member that drives track 20L. Sun gear 56s may be connected to ring gear 54r and to ring gear 52r to form the third rotating member that drives track 20R. Planet carrier 54p may be connected to planet carrier 52p to form the fourth rotating member driven by motor 24. Sun gear 54s may form the fifth rotating member driven by motor 26.

In the thirteenth embodiment listed in the table of FIG. 3B, ring gear 56r may be connected to sun gear 54s to form the first rotating member driven by motor 28. Planet carrier 56p may be connected to sun gear 52s to form the second rotating member that drives track 20L. Sun gear 56s may be connected to planet carrier 54p and planet carrier 52p to form the third rotating member that drives track 20R. Ring gear 54r may form the fourth rotating member driven by motor 26. Ring gear 52r may form the fifth rotating member driven by motor 24.

In the fourteenth embodiment listed in the table of FIG. 3B, ring gear 56r may be connected to sun gear 54s and to sun gear 52s to form the first rotating member driven by motor 28. Planet carrier 56p may form the second rotating member that drives track 20L. Sun gear 56s may be connected to planet carrier 52p to form the third rotating member that drives track 20R. Ring gear 54r may form the fourth rotating member driven by motor 26. Planet carrier 54p may be connected to ring gear 52r to form the fifth rotating member driven by motor 24.

In the fifteenth embodiment listed in the table of FIG. 3B, ring gear 56r may form the first rotating member driven by motor 28. Planet carrier 56p may be connected to ring gear 54r and to sun gear 52s to form the second rotating member that drives track 20L. Sun gear 56s may be connected to ring gear 52r to form the third rotating member that drives track 20R. Planet carrier 54p may form the fourth rotating member driven by motor 26. Sun gear 54s may be connected to planet carrier 52p to form the fifth rotating member driven by motor 24.

In the sixteenth embodiment listed in the table of FIG. 3B, ring gear 56r may form the first rotating member driven by motor 28. Planet carrier 56p may be connected to ring gear 54r and to sun gear 52s to form the second rotating member that drives track 20L. Sun gear 56s may be connected to sun gear 54s and to planet carrier 52p to form the third rotating member driven by motor 24. Planet carrier 54p may form the fourth rotating member driven by motor 26. Ring gear 52r may form the fifth rotating member that drives track 20R.

In the seventeenth embodiment listed in the table of FIG. 3B, ring gear 56r may be connected to planet carrier 54p and to sun gear 52s to form the first rotating member driven by motor 28. Planet carrier 56p may form the second rotating member that drives track 20L. Sun gear 56s may be connected to planet carrier 52p to form the third rotating member that drives track 20R. Ring gear 54r may form the fourth rotating member driven by motor 26. Sun gear 54s may be connected to ring gear 52r may to form the fifth rotating member driven by motor 24.

In the eighteenth embodiment listed in the table of FIG. 3B, ring gear 56r may form the first rotating member driven by motor 28. Planet carrier 56p may be connected to planet carrier 54p and to sun gear 52s to form the second rotating member that drives track 20L. Sun gear 56s may be connected to planet carrier 52p to form the third rotating member that drives track 20R. Ring gear 54r may form the fourth rotating member driven by motor 26. Sun gear 54s may be connected to ring gear 52r to form the fifth rotating member driven by motor 24.

In the nineteenth embodiment listed in the table of FIG. 3B, ring gear 56r may be connected to sun gear 54s and to sun gear 52s to form the first rotating member driven by motor 28. Planet carrier 56p may form the second rotating member that drives track 20L. Sun gear 56s may be connected to planet carrier 52p to form the third rotating member that drives track 20R. Ring gear 54r may form the fourth rotating member driven by motor 24. Planet carrier 54p may be connected to ring gear 52r to form the fifth rotating member driven by motor 26.

INDUSTRIAL APPLICABILITY

While the drive system of the present disclosure has potential application in any work machine, the disclosed drive system has particular applicability in track-type tractors and other heavy construction and mining work machines where steering is accomplished by inducing a moment from a difference in forces applied to opposing tracks. These induced moments may require high torque and/or high power input to function properly. The disclosed drive system may provide a low cost, efficient solution to the high torque and power demands of such work machines.

To propel tracks 20L, R of work machine 10, power generated by generator 22 may be selectively directed to motors 24-28, which are each connected to different input rotational members of planetary drive arrangement 30. The amount of power directed to each motor may determine the direction and speed of travel of work machine 10, and the associated efficiency of drive system 18.

Because all three motors 24-28 of drive system 18 may be used throughout the full operating range of work machine 10, the component cost, efficiency, and design flexibility of work machine 10 may be improved. Specifically, because motors 24-28 may operate throughout the operating range of work machine 10, the power absorbed by drive system 18 may always be divided among three motors, thereby reducing the maximum torque and/or power level experienced by any one motor. By lowering the maximum torque and/or power level experienced by any one motor, the required size of motors 24-28 may be reduced. Smaller motors are typically less expensive and more efficient. In addition, the smaller size of motors 24-28 may free space on work machine 10, thereby improving design flexibility of surrounding system components. Further, because motors 24-28 may be used during both low and high range applications, additional regeneration of power may be possible, further increasing the efficiency of work machine 10, as compared to drive systems having motors only usable during a high range operation of the work machine.

It will be apparent to those skilled in the art that various modifications and variations can be made in the disclosed drive arrangement without departing from the scope of the disclosure. Other embodiments of the disclosed drive arrangement will be apparent to those skilled in the art from consideration of the specification and practice of the drive arrangement disclosed herein. It is intended that the specification and examples be considered as exemplary only, with a true scope of the disclosure being indicated by the following claims and their equivalents.

What is claimed is:
1. A drive arrangement, comprising:
a first planetary gear set;
a second planetary gear set;
a third planetary gear set;
a first motor;
a second motor; and
a third motor,
wherein the first, second, and third motors are drivingly connected to the first, second, and third planetary gear sets, and the first, second, and third motors simulta- neously generate two output rotations to independently transmit power to two traction devices.

2. The drive arrangement of claim 1, wherein the first, second, and third planetary gear sets each include at least three elements, the at least three elements of the first, second, and third planetary gear sets being connected to form five members.

3. The drive arrangement of claim 2, wherein at least two elements of each of the first, second, and third planetary gear sets are connected to at least two elements of the other sets of the first, second, and third planetary gear sets.

4. The drive arrangement of claim 2, wherein each of the five members includes fewer than two elements from any one of the first, second, and third planetary gear set.

5. The drive arrangement of claim 2, wherein each of the first, second, and third planetary gear sets has fewer than three elements connected to any one other of the first, second, and third planetary gear sets.

6. The drive arrangement of claim 2, wherein:
the at least three elements includes:
  a sun gear;
  a planet carrier having planet gears; and
  a ring gear;
the first of the five members includes the connected ring gear of the first planetary gear set, planet carrier of the second planetary gear set, and planet carrier of the third planetary gear set;
the second of the five members includes the planet carrier of the first planetary gear set;
the third of the five members includes the connected sun gear of the first planetary gear set and sun gear of the second planetary gear set;
the fourth of the five members includes the connected ring gear of the second planetary gear set and ring gear of the third planetary gear set; and
the fifth of the five members includes the sun gear of the third planetary gear set.

7. The drive arrangement of claim 2, wherein:
the at least three elements includes:
  a sun gear;
  a planet carrier having planet gears; and
  a ring gear;
the first of the five members includes the connected ring gear of the first planetary gear set, sun gear of the second planetary gear set, and sun gear of the third planetary gear set;
the second of the five members includes the planet carrier of the first planetary gear set;
the third of the five members includes the connected sun gear of the first planetary gear set, ring gear of the second planetary gear set, and planet carrier of the third planetary gear set;
the fourth of the five members includes the planet carrier of the second planetary gear set; and
the fifth of the five members includes the ring gear of the third planetary gear set.

8. The drive arrangement of claim 2, wherein:
the at least three elements includes:
  a sun gear;
  a planet carrier having planet gears; and
  a ring gear;
the first of the five members includes the ring gear of the first planetary gear set;
the second of the five members includes the connected planet carrier of the first planetary gear set and ring gear of the second planetary gear set;
the third of the five members includes the connected sun gear of the first planetary gear set, sun gear of the second planetary gear set, and planet carrier of the third planetary gear set;
the fourth of the five members includes the connected planet carrier of the second planetary gear set and sun gear of the third planetary gear set; and
the fifth of the five members includes the ring gear of the third planetary gear set.

9. The drive arrangement of claim 2, wherein:
the at least three elements includes:
  a sun gear;
  a planet carrier having planet gears; and
  a ring gear;
the first of the five members includes the connected ring gear of the first planetary gear set and planet carrier of the second planetary gear set;
the second of the five members includes the connected planet carrier of the first planetary gear set and planet carrier of the third planetary gear set;
the third of the five members includes the connected sun gear of the first planetary gear set, sun gear of the second planetary gear set, and sun gear of the third planetary gear set;
the fourth of the five members includes the ring gear of the second planetary gear set; and
the fifth of the five members includes the ring gear of the third planetary gear set.

10. The drive arrangement of claim 2, wherein:
the at least three elements includes:
  a sun gear;
  a planet carrier having planet gears; and
  a ring gear;
the first of the five members includes the ring gear of the first planetary gear set;
the second of the five members includes the connected planet carrier of the first planetary gear set, ring gear of the second planetary gear set, and sun gear of the third planetary gear set;
the third of the five members includes the connected sun gear of the first planetary gear set and planet carrier of the third planetary gear set;
the fourth of the five members includes the planet carrier of the second planetary gear set; and
the fifth of the five members includes the connected sun gear of the second planetary gear set and ring gear of the third planetary gear set.

11. The drive arrangement of claim 2, wherein:
the at least three elements includes:
  a sun gear;
  a planet carrier having planet gears; and
  a ring gear;
the first of the five members includes the ring gear of the first planetary gear set;
the second of the five members includes the connected planet carrier of the first planetary gear set and the ring gear of the third planetary gear set;
the third of the five members includes the connected sun gear of the first planetary gear set, sun gear of the second planetary gear set, and the sun gear of the third planetary gear set;
the fourth of the five members includes the ring gear of the second planetary gear set; and
the fifth of the five members includes the connected planet carrier of the second planetary gear set and the planet carrier of the third planetary gear set.

12. The drive arrangement of claim 2, wherein:
the at least three elements includes:
   a sun gear;
   a planet carrier having planet gears; and
   a ring gear;
the first of the five members includes the ring gear of the first planetary gear set;
the second of the five members includes the connected planet carrier of the first planetary gear set, planet carrier of the second planetary gear set, and sun gear of the third planetary gear set;
the third of the five members includes the connected sun gear of the first planetary gear set, sun gear of the second planetary gear set, and planet carrier of the third planetary gear set;
the fourth of the five members includes the ring gear of the second planetary gear set; and
the fifth of the five members includes the ring gear of the third planetary gear set.

13. The drive arrangement of claim 2, wherein:
the at least three elements includes:
   a sun gear;
   a planet carrier having planet gears; and
   a ring gear;
the first of the five members includes the ring gear of the first planetary gear set;
the second of the five members includes the connected planet carrier of the first planetary gear set and ring gear of the third planetary gear set;
the third of the five members includes the connected sun gear of the first planetary gear set and ring gear of the second planetary gear set;
the fourth of the five members includes the connected planet carrier of the second planetary gear set and planet carrier of the third planetary gear set; and
the fifth of the five members includes the connected sun gear of the second planetary gear set and sun gear of the third planetary gear set.

14. The drive arrangement of claim 2, wherein:
the at least three elements includes:
   a sun gear;
   a planet carrier having planet gears; and
   a ring gear;
the first of the five members includes the connected ring gear of the first planetary gear set and sun gear of the third planetary gear set;
the second of the five members includes the planet carrier of the first planetary gear set;
the third of the five members includes the connected sun gear of the first planetary gear set, ring gear of the second planetary gear set, and ring gear of the third planetary gear set;
the fourth of the five members includes the planet carrier of the second planetary gear set; and
the fifth of the five members includes the sun gear of the second planetary gear set and the planet carrier of the third planetary gear set.

15. The drive arrangement of claim 2, wherein:
the at least three elements includes:
   a sun gear;
   a planet carrier having planet gears; and
   a ring gear;
the first of the five members includes the ring gear of the first planetary gear set;
the second of the five members includes the connected planet carrier of the first planetary gear set and ring gear of the second planetary gear set;
the third of the five members includes the connected sun gear of the first planetary gear set and ring gear of the third planetary gear set;
the fourth of the five members includes the connected planet carrier of the second planetary gear set and sun gear of the third planetary gear set; and
the fifth of the five members includes the connected sun gear of the second planetary gear set and planet carrier of the third planetary gear set.

16. The drive arrangement of claim 2, wherein:
the at least three elements includes:
   a sun gear;
   a planet carrier having planet gears; and
   a ring gear;
the first of the five members includes the ring gear of the first planetary gear set;
the second of the five members includes the connected planet carrier of the first planetary gear set and planet carrier of the second planetary gear set;
the third of the five members includes the connected sun gear of the first planetary gear set, sun gear of the second planetary gear set, and planet carrier of the third planetary gear set;
the fourth of the five members includes the connected ring gear of the second planetary gear set and sun gear of the third planetary gear set; and
the fifth of the five members includes the ring gear of the third planetary gear set.

17. The drive arrangement of claim 2, wherein:
the at least three elements includes:
   a sun gear;
   a planet carrier having planet gears; and
   a ring gear;
the first of the five members includes the connected ring gear of the first planetary gear set and sun gear of the third planetary gear set;
the second of the five members includes the planet carrier of the first planetary gear set;
the third of the five members includes the connected sun gear of the first planetary gear set, ring gear of the second planetary gear set, and ring gear of the third planetary gear set;
the fourth of the five members includes the connected planet carrier of the second planetary gear set and planet carrier of the third planetary gear set; and
the fifth of the five members includes the sun gear of the second planetary gear set.

18. The drive arrangement of claim 2, wherein:
the at least three elements includes:
   a sun gear;
   a planet carrier having planet gears; and
   a ring gear;
the first of the five members includes the connected ring gear of the first planetary gear set and sun gear of the second planetary gear set;
the second of the five members includes the planet carrier of the first planetary gear set and sun gear of the third planetary gear set;
the third of the five members includes the connected sun gear of the first planetary gear set, planet carrier of the second planetary gear set, and planet carrier of the third planetary gear set;
the fourth of the five members includes the ring gear of the second planetary gear set; and
the fifth of the five members includes the ring gear of the third planetary gear set.

19. The drive arrangement of claim 2, wherein:
the at least three elements includes:
- a sun gear;
- a planet carrier having planet gears; and
- a ring gear;

the first of the five members includes the connected ring gear of the first planetary gear set, sun gear of the second planetary gear set, and sun gear of the third planetary gear set;

the second of the five members includes the planet carrier of the first planetary gear set;

the third of the five members includes the connected sun gear of the first planetary gear set and planet carrier of the third planetary gear set;

the fourth of the five members includes the ring gear of the second planetary gear set; and the fifth of the five members includes the planet carrier of the third planetary gear set and the ring gear of the second planetary gear set.

20. The drive arrangement of claim 2, wherein:
the at least three elements includes:
- a sun gear;
- a planet carrier having planet gears; and
- a ring gear;

the first of the five members includes the ring gear of the first planetary gear set;

the second of the five members includes the connected planet carrier of the first planetary gear set, ring gear of the second planetary gear set, and sun gear of the third planetary gear set;

the third of the five members includes the connected sun gear of the first planetary gear set and ring gear of the third planetary gear set;

the fourth of the five members includes the planet carrier of the second planetary gear set; and the fifth of the five members includes the connected sun gear of the second planetary gear set and planet carrier of the third planetary gear set.

21. The drive arrangement of claim 2, wherein:
the at least three elements includes:
- a sun gear;
- a planet carrier having planet gears; and
- a ring gear;

the first of the five members includes the ring gear of the first planetary gear set;

the second of the five members includes the connected planet carrier of the first planetary gear set, the ring gear of the second planetary gear set and the sun gear of the third planetary gear set;

the third of the five members includes the connected sun gear of the first planetary gear set, sun gear of the second planetary gear set, and planet carrier of the third planetary gear set;

the fourth of the five members includes the planet carrier of the second planetary gear set; and the fifth of the five members includes the ring gear of the third planetary gear set.

22. The drive arrangement of claim 2, wherein:
the at least three elements includes:
- a sun gear;
- a planet carrier having planet gears; and
- a ring gear;

the first of the five members includes the connected ring gear of the first planetary gear set, planet carrier of the second planetary gear set, and sun gear of the third planetary gear set;

the second of the five members includes the planet carrier of the first planetary gear set;

the third of the five members includes the connected sun gear of the first planetary gear set and planet carrier of the third planetary gear set;

the fourth of the five members includes the ring gear of the second planetary gear set; and the fifth of the five members includes the connected sun gear of the second planetary gear set and ring gear of the third planetary gear set.

23. The drive arrangement of claim 2, wherein:
the at least three elements includes:
- a sun gear;
- a planet carrier having planet gears; and
- a ring gear;

the first of the five members includes the ring gear of the first planetary gear set;

the second of the five members includes the connected planet carrier of the first planetary gear set, planet carrier of the second planetary gear set, and sun gear of the third planetary gear set;

the third of the five members includes the connected sun gear of the first planetary gear set and planet carrier of the third planetary gear set;

the fourth of the five members includes the ring gear of the second planetary gear set; and the fifth of the five members includes the connected sun gear of the second planetary gear set and ring gear of the third planetary gear set.

24. The drive arrangement of claim 2, wherein:
the at least three elements includes:
- a sun gear;
- a planet carrier having planet gears; and
- a ring gear;

the first of the five members includes the connected ring gear of the first planetary gear set, sun gear of the second planetary gear set, and sun gear of the third planetary gear set;

the second of the five members includes the planet carrier of the first planetary gear set;

the third of the five members includes the connected sun gear of the first planetary gear set and planet carrier of the third planetary gear set;

the fourth of the five members includes the ring gear of the second planetary gear set; and the fifth of the five members includes the connected planet carrier of the second planetary gear set and ring gear of the third planetary gear set.

25. A machine, comprising:
a power source operable to generate a power output;
a first traction device;
a second traction device;
a planetary gear arrangement configured to drive the first and second traction devices and having:
- a first planetary gear set;
- a second planetary gear set; and
- a third planetary gear set;

a first motor;
a second motor; and
a third motor,
wherein the first, second, and third motors are drivingly connected by way of the first, second, and third planetary gear sets, and the first, second, and third motors simultaneously generate two output rotations to independently transmit power to each of the first and second traction devices.

26. The machine of claim 25, wherein the first, second, and third planetary gear sets each include at least three elements, the at least three elements of the first, second, and third planetary gear sets being connected to form five members.

27. The machine of claim 26, wherein at least two elements of each of the first, second, and third planetary gear sets are connected to at least two elements of the other sets of the first, second, and third planetary gear sets.

28. The machine of claim 26, wherein each of the five members includes fewer than two elements from any one of the first, second, and third planetary gear set.

29. The machine of claim 26, wherein each of the first, second, and third planetary gear sets has fewer than three elements connected to any one other of the first, second, and third planetary gear sets.

* * * * *